United States Patent
Hung et al.

(10) Patent No.: US 10,154,205 B2
(45) Date of Patent: Dec. 11, 2018

(54) ELECTRONIC DEVICE AND IMAGE PROCESSING METHOD THEREOF

(71) Applicant: Wistron Corp., New Taipei (TW)

(72) Inventors: Chih-Yang Hung, New Taipei (TW); Yao-Tsung Chang, New Taipei (TW); Chu-Chia Tsai, New Taipei (TW); Ping-Hung Chen, New Taipei (TW); Ching-Fu Hsu, New Taipei (TW)

(73) Assignee: WISTRON CORP., New Taipei (TW)

( * ) Notice: Subject to any disclaimer, the term of this patent is extended or adjusted under 35 U.S.C. 154(b) by 250 days.

(21) Appl. No.: 15/138,009

(22) Filed: Apr. 25, 2016

(65) Prior Publication Data
US 2017/0142346 A1    May 18, 2017

(30) Foreign Application Priority Data

Nov. 17, 2015 (TW) .............................. 104137821 A

(51) Int. Cl.
| | | |
|---|---|---|
| H04N 5/262 | (2006.01) | |
| H04N 5/349 | (2011.01) | |
| H04N 5/232 | (2006.01) | |
| G06T 3/40 | (2006.01) | |
| H04N 5/225 | (2006.01) | |

(52) U.S. Cl.
CPC ......... *H04N 5/2621* (2013.01); *G06T 3/4053* (2013.01); *H04N 5/2257* (2013.01); *H04N 5/23216* (2013.01); *H04N 5/23232* (2013.01); *H04N 5/349* (2013.01)

(58) Field of Classification Search
CPC ............. G09G 2340/10; H04N 5/2624; H04N 5/2628; H04N 5/265; H04N 13/0239; H04N 13/025; H04N 13/0214; H04N 13/0217
See application file for complete search history.

(56) References Cited

U.S. PATENT DOCUMENTS

2016/0212332 A1*   7/2016  Tang ................... H04N 5/23232

FOREIGN PATENT DOCUMENTS

| TW | 462567 | 11/2001 |
|---|---|---|
| TW | 569617 | 1/2004 |

OTHER PUBLICATIONS

Taiwan Patent Office, Office Action, Patent Application Serial No. 104137821, dated May 23, 2016, Taiwan.

* cited by examiner

*Primary Examiner* — Nelson D. Hernández Hernández

(57) ABSTRACT

An example of the invention provides an electronic device. The electronic device includes a camera module, a control unit and a computing unit. The control unit controls the camera module to acquire a first image and a second image. The computing unit receives the first image and the second image to generate a third image, wherein the resolution of the third image is greater than the resolution of the first image and the resolution of the second image.

12 Claims, 10 Drawing Sheets

| $O_{(0,0)}$ | $O_{(1,0)}$ | $O_{(2,0)}$ | $O_{(3,0)}$ | $\cdots$ | $O_{(m,0)}$ |
|---|---|---|---|---|---|
| $O_{(0,1)}$ | $O_{(1,1)}$ | $O_{(2,1)}$ | $O_{(3,1)}$ | $\cdots$ | $O_{(m,1)}$ |
| $O_{(0,2)}$ | $O_{(1,2)}$ | $O_{(2,2)}$ | $O_{(3,2)}$ | $\cdots$ | $O_{(m,2)}$ |
| $\vdots$ | $\vdots$ | $\vdots$ | $\vdots$ | $\cdots$ | $\vdots$ |
| $O_{(0,n)}$ | $O_{(1,n)}$ | $O_{(2,n)}$ | $O_{(3,n)}$ | $\cdots$ | $O_{(m,n)}$ |

FIG. 2

| $\Delta_{(0,0)}$ | $\Delta_{(1,0)}$ | $\Delta_{(2,0)}$ | $\Delta_{(3,0)}$ | $\cdots$ | $\Delta_{(m,0)}$ |
|---|---|---|---|---|---|
| $\Delta_{(0,1)}$ | $\Delta_{(1,1)}$ | $\Delta_{(2,1)}$ | $\Delta_{(3,1)}$ | $\cdots$ | $\Delta_{(m,1)}$ |
| $\Delta_{(0,2)}$ | $\Delta_{(1,2)}$ | $\Delta_{(2,2)}$ | $\Delta_{(3,2)}$ | $\cdots$ | $\Delta_{(m,2)}$ |
| $\vdots$ | $\vdots$ | $\vdots$ | $\vdots$ | $\cdots$ | $\vdots$ |
| $\Delta_{(0,n)}$ | $\Delta_{(1,n)}$ | $\Delta_{(2,n)}$ | $\Delta_{(3,n)}$ | $\cdots$ | $\Delta_{(m,n)}$ |

| $P_{(0,0)}$ | $X_{(1,0)}$ | $P_{(2,0)}$ | $X_{(3,0)}$ | $P_{(4,0)}$ | ⋮ | $P_{(2m-1,0)}$ | $X_{(2m,0)}$ |
|---|---|---|---|---|---|---|---|
| $X_{(0,1)}$ | $P_{(1,1)}$ | $X_{(2,1)}$ | $P_{(3,1)}$ | $X_{(4,1)}$ | ⋮ | $X_{(2m-1,1)}$ | $P_{(2m,1)}$ |
| $P_{(0,2)}$ | $X_{(1,2)}$ | $P_{(2,2)}$ | $X_{(3,2)}$ | $P_{(4,2)}$ | ⋮ | $P_{(2m-1,2)}$ | $X_{(2m,2)}$ |
| $X_{(0,3)}$ | $P_{(1,3)}$ | $X_{(2,3)}$ | $P_{(3,3)}$ | $X_{(4,3)}$ | ⋮ | $X_{(2m-1,3)}$ | $P_{(2m,3)}$ |
| $P_{(0,4)}$ | $X_{(1,4)}$ | $P_{(2,4)}$ | $X_{(3,4)}$ | $P_{(4,4)}$ | ⋮ | $P_{(2m-1,4)}$ | $X_{(2m,4)}$ |
| ⋯ | ⋯ | ⋯ | ⋯ | ⋯ | ⋮ | ⋯ | ⋯ |
| $P_{(0,2n-1)}$ | $X_{(1,2n-1)}$ | $P_{(2,2n-1)}$ | $X_{(3,2n-1)}$ | $P_{(4,2n-1)}$ | ⋮ | $P_{(2m-1,2n-1)}$ | $X_{(m,2n-1)}$ |
| $X_{(0,2n)}$ | $P_{(1,2n)}$ | $X_{(2,2n)}$ | $P_{(3,2n)}$ | $X_{(4,2n)}$ | ⋮ | $X_{(2m-1,n)}$ | $P_{(m,n)}$ |

FIG. 5

ELECTRONIC DEVICE AND IMAGE PROCESSING METHOD THEREOF

CROSS REFERENCE TO RELATED APPLICATIONS

This application claims priority of Taiwan Patent Application No. 104137821, filed on Nov. 17, 2015, the entirety of which is incorporated by reference herein.

BACKGROUND OF THE INVENTION

Field of the Invention

The present invention relates to an image generation method and more particularly to a high-resolution image generation method according to known images.

Description of the Related Art

With the progress and development of technology, most handheld electronic devices, such as mobile phones, personal digital assistants, tablet, etc., are equipped with a camera unit to implement the camera function. In general, the camera module embedded on the handheld electronic device cannot be replaced. It means that the resolution of images taken by the camera module cannot be changed. It is inconvenient for uses who have the demand on high resolution images.

BRIEF SUMMARY OF THE INVENTION

With the popularity of 3D images, more and more handheld electronic devices are equipped with a dual-lens camera module. The invention uses two images captured by the dual-lens camera module to generate a high-resolution image.

An embodiment of the invention provides an electronic device including a camera module, a control unit and a computing unit. The control unit controls the camera module to capture a first image and a second image. The computing unit receives the first image and the second image to generate a third image, wherein a resolution of the third image is higher than a resolution of the first image and the second image.

Another embodiment of the invention provides an image processing method for an electronic device with a camera module, comprising steps of capturing a first image and a second image via the camera module; applying an image to the first image and the second image to find corresponding relation between the first image and the second image; combining the first image and the second image to generate a third image according to the corresponding relation, wherein a resolution of the third image is higher than a resolution of the first image and the second image.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 2 is a schematic diagram of a first image.

FIG. 3 is a schematic diagram of a second image.

FIG. 4 is a schematic of a temporarily image generated by the proposed image processing method.

FIG. 5 is a schematic of a high-resolution image generated by the proposed image processing method.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
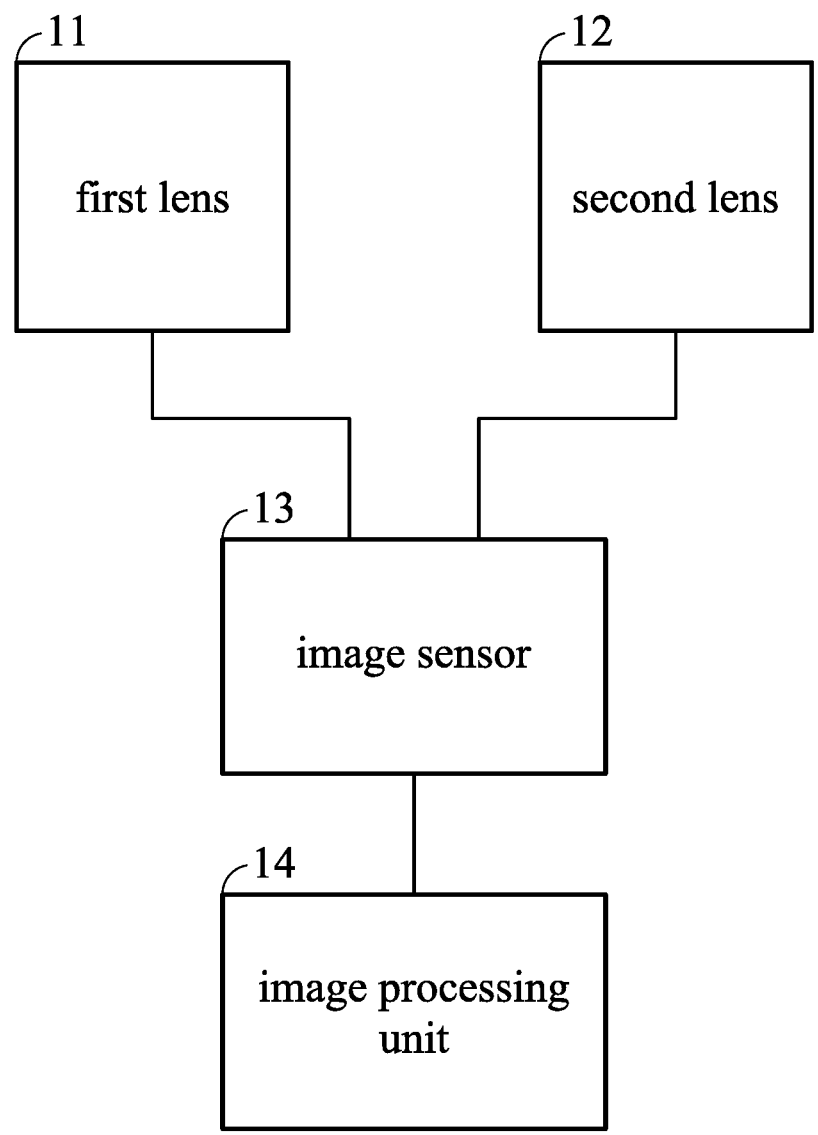
FIG. 1 is a schematic diagram of an electronic device according to an embodiment of the invention.

FIG. 1 is a schematic diagram of an electronic device according to an embodiment of the invention. The electronic device comprises a first lens 11, a second lens 12, an image sensor 13 and a computing unit 14. The first lens 11 transmits a first light beam to the image sensor 13 to generate a first image. The second lens 12 transmits a second light beam to the image sensor 13 to generate a second image. In this embodiment, the resolution of the first image and the second image is N×M pixels.

The image sensor 13 transmits the first image and the second image to the computing unit 14 to generate a third image. In one embodiment, the computing unit 14 first applies an image comparison procedure to the first image and the second image to find corresponding relation between the first image and the second image, and combines the first image and the second image to generate the third image according to the corresponding relation.

In one embodiment, the computing unit 14 may be a graphic processor, a controller of the electronic device or software or firmware executed by a processor or a controller. To clearly explain the operation of the computing unit 14, please refer to FIGS. 2-5.

Figure 4:
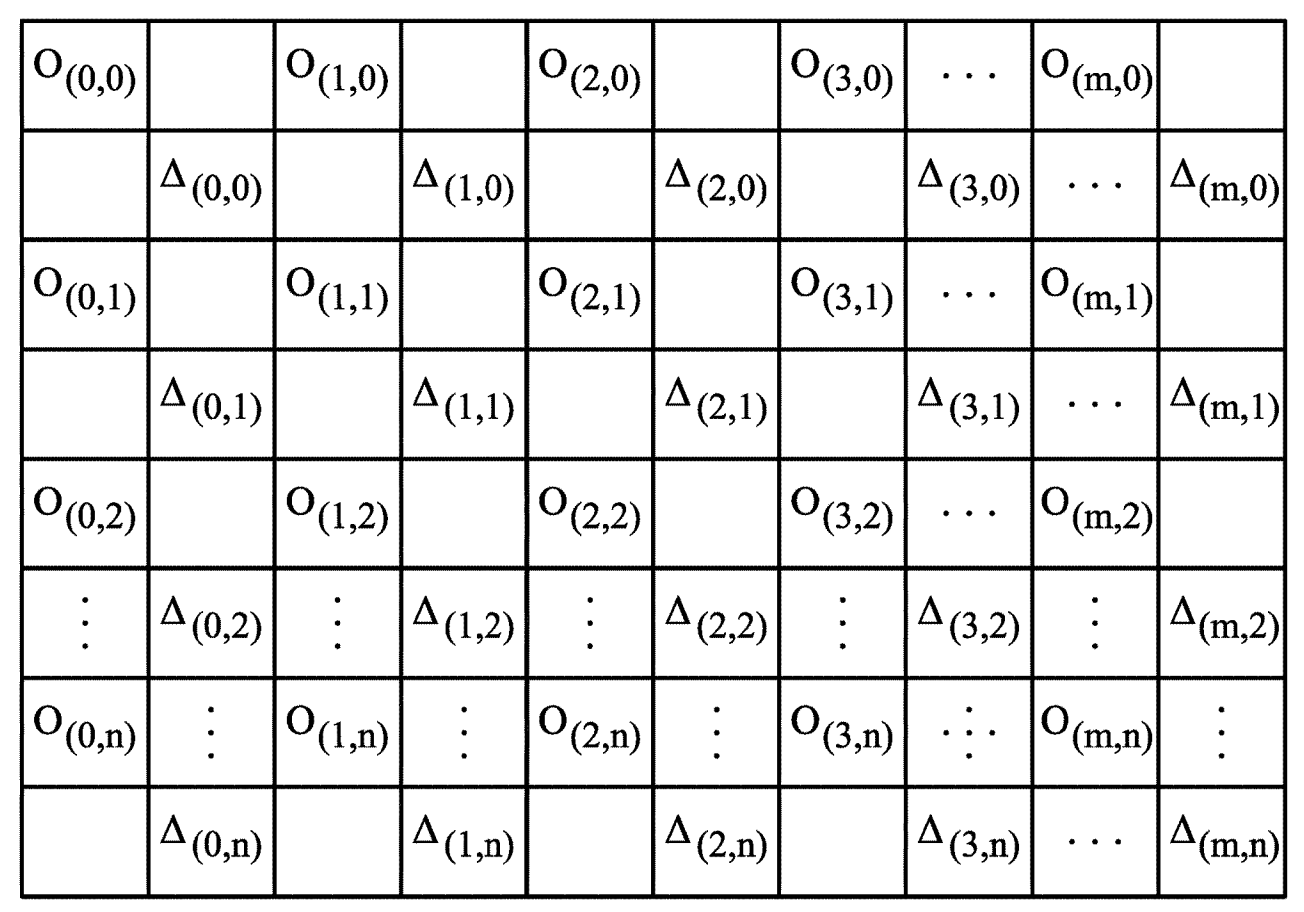

FIG. 2 is a schematic diagram of a first image. FIG. 3 is a schematic diagram of a second image. When the computing unit 14 receives the first image and the second image, the computing unit 14 generates a temporary image according to the first image and the second image, and the temporary image is shown as FIG. 4. FIG. 4 is a schematic of a temporary image generated by the proposed image processing method. It is found that each pixel column of the first image and each pixel column of the second image are arranged alternately, and the first pixel $\Delta(0,0)$ of the first pixel column (pixels $\Delta(0,0)$~$\Delta(0,n)$) of the second image is shifted one pixel to the first pixel $O(0,0)$ of the first pixel column (pixels $O(0,0)$~$O(0,n)$) of the first image.

Then the computing unit 14 generates pixel values of unknown pixels according to the pixel values of known pixel (labeled as $P(i,j)$ on FIG. 5) to generate the third image, such as shown in FIG. 5. The pixel value of unknown pixel $X(i,j)$ is generated as following:

If the pixel X(i,j) is at the four edges of the third image, such as the first pixel column or the first pixel row, the pixel value of the pixel X(i,j) is generated by the following equation:

$$X(i,j)=(1/3)*[P(i-1,j)+P(i+1,j)+P(i,j\pm 1)] \text{ or}$$

$$X(i,j)=(1/3)*[(P(ij-1)+P(i,j+1)+P(i\pm 1,j))$$

If the pixel X(i,j) is at the four corners of the third image, such as the pixel X(2m,0) or X(0,2n), the pixel value of the pixel X(i,j) is generated by the following equation:

$$X(i,j)=(1/2)*[P(i\pm 1,j)+P(i,j\pm 1)]$$

If the pixel X(i,j) is at the internal position of the third image, the pixel value of the pixel X(i,j) is generated by the following equation:

$$X(i,j)=(1/4)*[P(i+1,j)+P(i-1,j)+P(i,j+1)+P(ij-1)]$$

According to the paragraphs above, the invention can combine two images with resolution (N× M) to generate the third image with resolution (2N×2M).

Furthermore, the pixel value generation of pixel X(i,j) above is for illustration only, and not to limit the invention thereto. A person skilled in the art can use a weight values according to a view angle difference between the first image and the second image to generate the pixel value pixel X(i,j).

In another embodiment, the third image is generated by arranging each pixel column of the first image and each pixel column of the second image alternately or by arranging each pixel row of the first image and each pixel row of the second image alternately. For example, the first pixel column of the third image is the first pixel column of the first image, the second pixel column of the third image is the first pixel column of the second image and so on. In another example, the first pixel row of the third image is the first pixel row of the first image, the second pixel row of the third image is the first pixel row of the second image and so on.

Figure 6A:
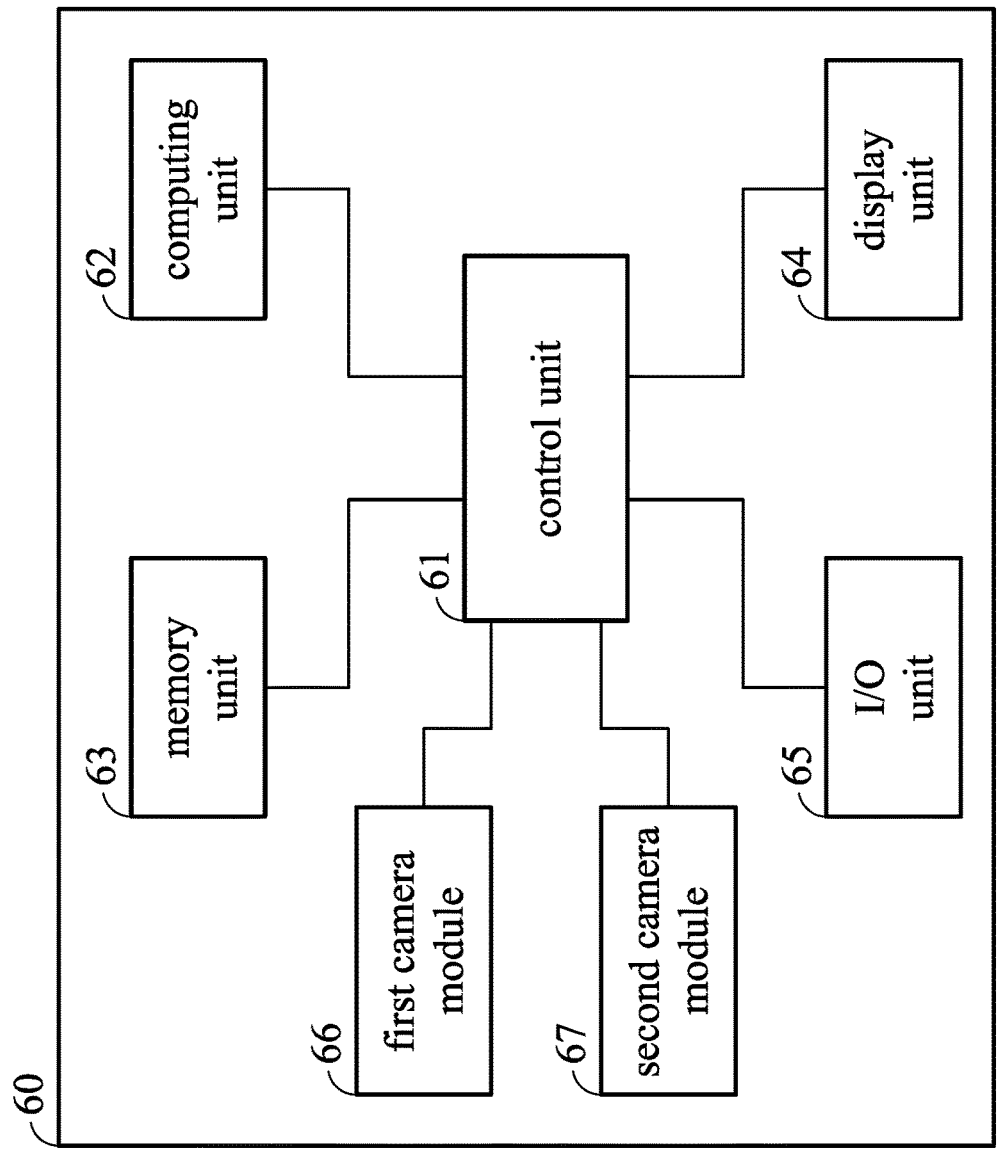
FIG. 6A is a schematic of an electronic device with a dual-lens camera module according to an embodiment of the invention.

FIG. 6A is a schematic of an electronic device with a dual-lens camera module according to an embodiment of the invention. The electronic device 60 comprises a control unit 61, a computing unit 62, a memory unit 63, a display unit 64, an I/O (input/output) unit 65, a first camera module 66, and a second camera module 67. In one embodiment, the first camera module 66 and the second camera module 67 can be a camera module with dual lens, and the first camera module 66 and the second camera module 67 have respective image sensors for capturing images.

In this embodiment the resolution of the image captured by the first camera module 66 and the second camera module 67 is (N×M). The control unit may be implemented by a controller or a processor to control the first camera module 66 and the second camera module 67, such as the focus, shutter or aperture ratio thereof. In another embodiment, the control unit 61 processes all the operation of the electronic device.

The memory unit 63 stores the first image and the second image captured by the first camera module 66 and the second camera module 67. Furthermore, the memory unit 63 stores programs executed by the control unit 61. The I/O unit 65 is provided to the user for inputting data a, controlling the electronic device 60 or outputting the data of the electronic device 60. In one embodiment, the I/O unit 65 generates a control interface displayed in the display unit 64. In this embodiment, the display unit 64 shows images captured by the first camera module 66 and the second camera module 67 or the image generated by the computing unit 62.

The computing unit 62 receives the first image and the second image captured by the first camera module 66 and the second camera module 67, and applies an image comparison procedure to the first image and the second image to find corresponding relation between the first image and the second image to generate image information such as shown in FIG. 2 and FIG. 3. Then, the computing unit 62 combines the first image and the second image to generate a third image, wherein the resolution of the third image is (2N*2M). The detail operation of the computing unit 62 can be referred to the description of FIG. 4 and FIG. 5.

Figure 6B:
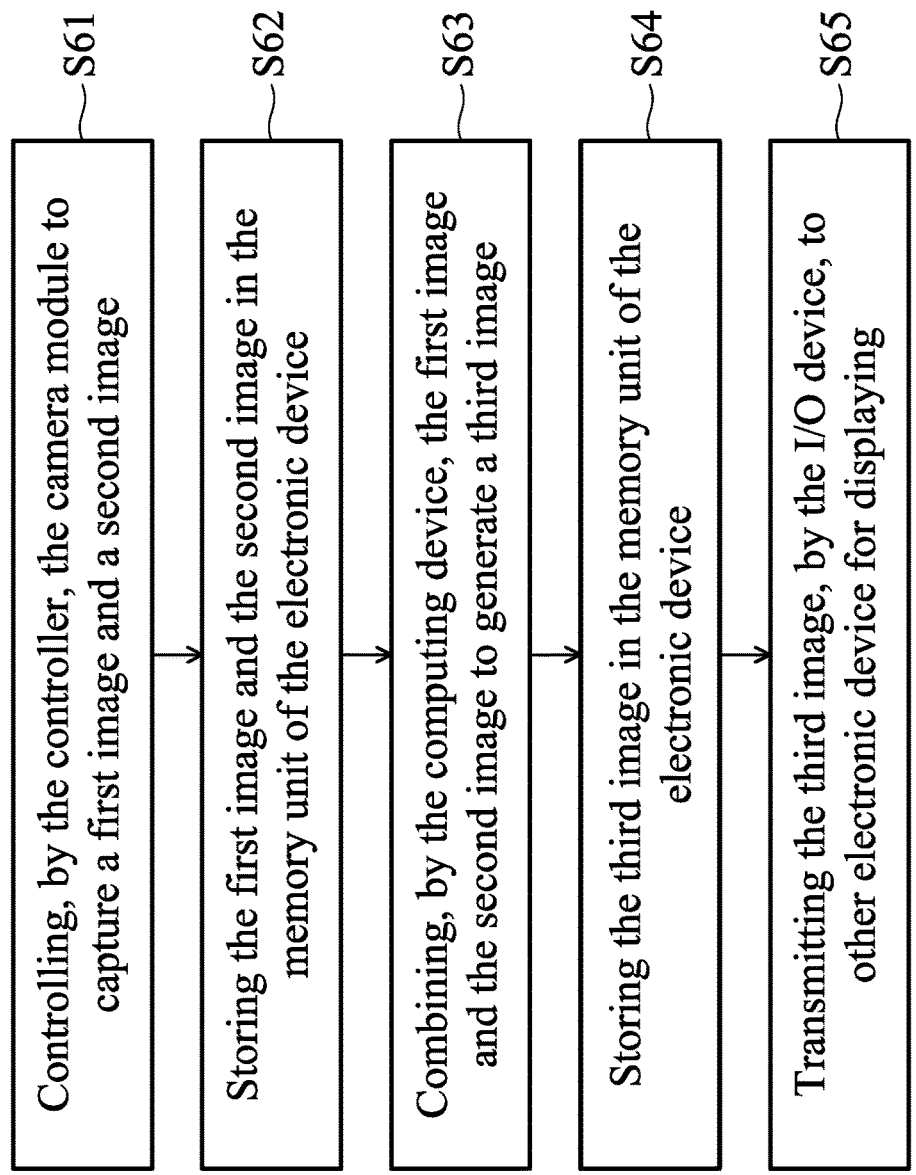
FIG. 6B is a flow chart of an image processing method according to an embodiment of the invention.

FIG. 6B is a flow chart of an image processing method according to an embodiment of the invention. The proposed image processing method can be applied to the electronic device with a dual-lens camera module. In one embodiment, the image processing method can be executed by the electronic device of FIG. 6A. In step S61, the controller of the electronic device controls the dual-lens camera module or two camera modules to capture a first image and a second image. The first image and the second image may be captured at the same time or at different time points.

In step S62, the first image and the second image are stored in the memory unit of the electronic device. In step S63, the computing unit of the electronic device accesses the first image and the second image, and applies an image to the first image and the second image to find corresponding relation between the first image and the second image, such as the image information shown in FIG. 2 and FIG. 3. The computing unit combines the first image and the second image to generate the third image. In this embodiment, the resolution of the first image and the second image is (N×M), and the resolution of the third image is (2N×2M). The detail operation of the computing unit can be referred to the paragraphs corresponding to FIG. 4 and FIG. 5.

In step S64, the third image is stored in the memory of the electronic device and displayed by the display device of the electronic device. Note that when the user determines to generate a high-resolution image by the computing unit of the electronic device, the first image and the second image are not displayed on the display device of the electronic device. In step S65, the third image is displayed by the display device of the electronic device or transmitted to other device for displaying.

Figure 7A:
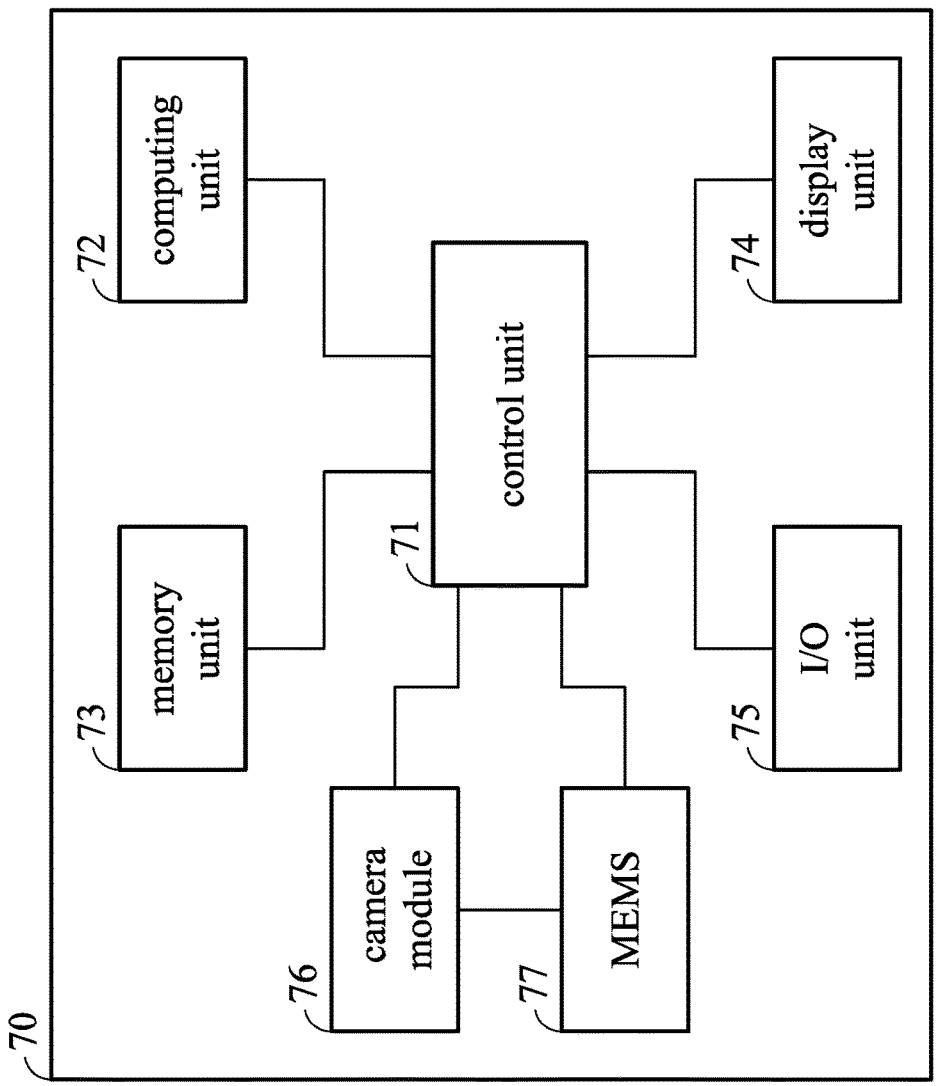
FIG. 7A is a schematic of an electronic device with a single-lens camera module according to another embodiment of the invention.

FIG. 7A is a schematic of an electronic device with a single-lens camera module according to another embodiment of the invention. Compared with the electronic device of FIG. 6, only one camera module is embedded in the electronic device and the camera module is controlled by the MEMS (microelectromechanical systems) 77 to capture two images at different time point to form a high-resolution image. The electronic device 70 comprises a control unit 71, a computing unit 72, a memory unit 73, a display unit 74, an I/O unit 75, a camera module 76 and the MEMS 77.

In this embodiment the resolution of the first image or the second image captured by the camera module 76 is (N×M). The control unit 71 is implemented by a controller or a processor to control the camera module 76, such as the focus, shutter or aperture ratio thereof. In another embodiment, the control unit 71 processes all the operation of the electronic device 70. In this embodiment, the control unit 71 controls the camera module 76 to capture the first image at a first time point. Then, the control unit 71 transmits a control signal to the MEMS 77 to shift the camera module 76 for a predetermined distance or angle, and the camera module 76 captures the second image at a second time point.

The memory unit 73 stores the first image and the second image captured by the camera module 76. Furthermore, the memory unit 73 stores programs executed by the control unit 71. The I/O unit 75 is provided to the user for inputting data, controlling the electronic device 70 or outputting the data of the electronic device 70. In one embodiment, the I/O unit 75 generates a control interface displayed in the display unit 74. In this embodiment, the display unit 74 shows images captured by the camera module 76 or the image generated by the computing unit 72.

The computing unit 72 receives the first image and the second image captured by the camera module 76, and applies an image comparison procedure to the first image and the second image to find corresponding relation between the first image and the second image to generate image information such as shown in FIG. 2 and FIG. 3. Then, the computing unit 72 combines the first image and the second image to generate a third image, wherein the resolution of the third image is (2N*2M). The detail operation of the computing unit 72 can be referred to the description of FIG. 4 and FIG. 5.

Figure 7B:
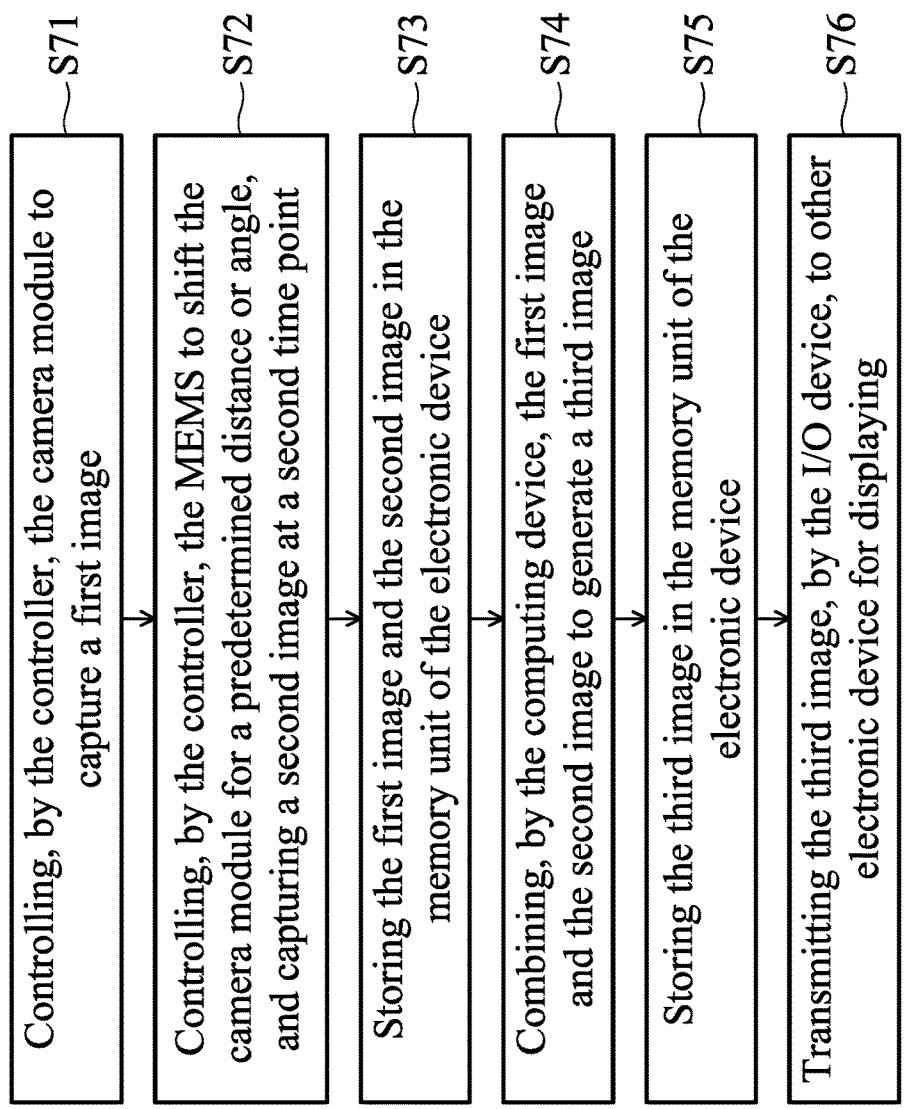
FIG. 7B is a flow chart of an image processing method according to another embodiment of the invention.

FIG. 7B is a flow chart of an image processing method according to another embodiment of the invention. The proposed image processing method can be applied to the electronic device with a single-lens camera module. In one embodiment, the image processing method can be executed by the electronic device of FIG. 7A. In step S81, the controller of the electronic device controls the camera module to capture a first image at a first time point. In step S82, the controller of the electronic device controls the MEMS to shift the camera module for a predetermined distance or angle, and the camera module captures the second image at a second time point.

In step 73, the first image and the second image are stored in the memory of the electronic device. In step S74, the computing device accesses the first image and the second image, and applies an image to the first image and the second image to find corresponding relation between the first image and the second image, such as the image information shown in FIG. 2 and FIG. 3. The computing unit combines the first image and the second image to generate the third image. In this embodiment, the resolution of the first image and the second image is (N×M), and the resolution of the third image is (2N×2M). The detail operation of the computing unit can be referred to the paragraphs corresponding to FIG. 4 and FIG. 5.

In step S75, the third image is stored in the memory of the electronic device and displayed by the display device of the electronic device. Note that when the user determines to generate a high-resolution image by the computing unit of the electronic device, the first image and the second image are not displayed on the display device of the electronic device. In step S76, the third image is displayed by the display device of the electronic device or transmitted to other device for displaying.

Figure 8A:
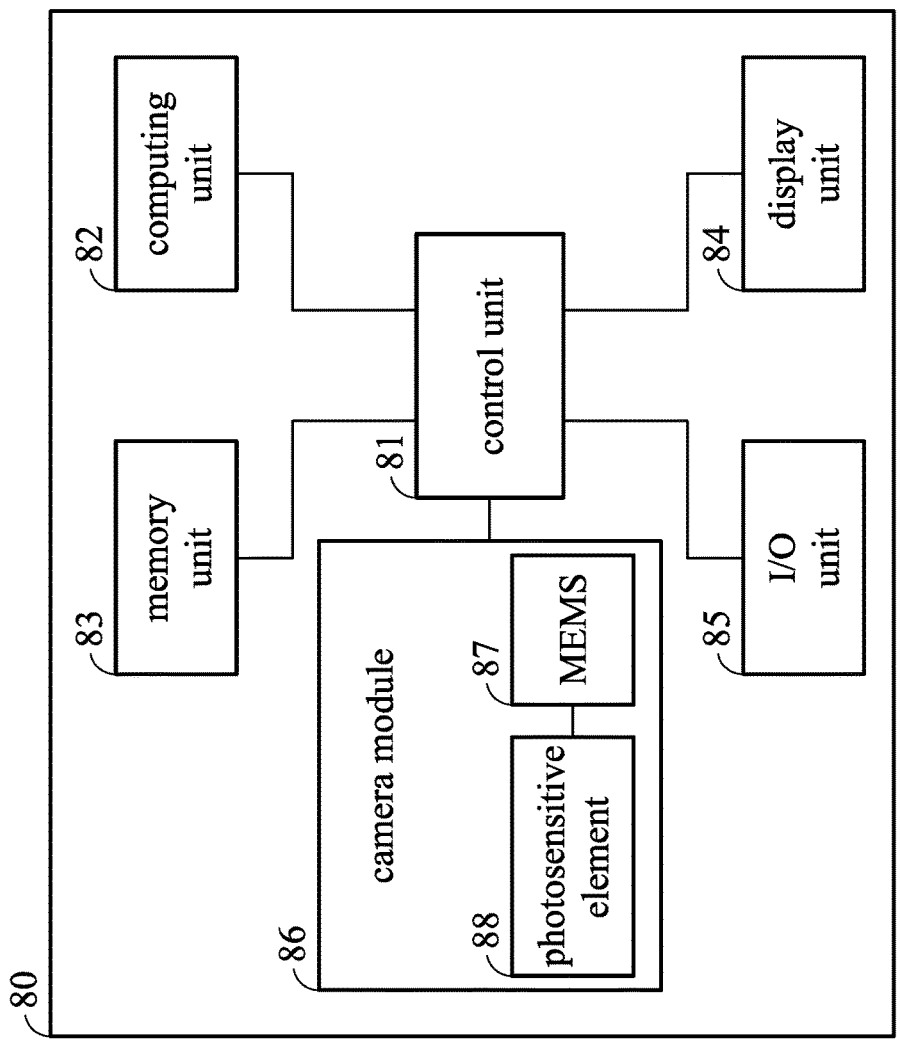
FIG. 8A is a schematic of an electronic device with a single-lens camera module according to another embodiment of the invention.

FIG. 8A is a schematic of an electronic device with a single-lens camera module according to another embodiment of the invention. Compared with the electronic device of FIG. 6, only one camera module is embedded in the electronic device and the camera module is controlled by the MEMS (microelectromechanical systems) 87 to capture two images at different time point to form a high-resolution image. The electronic device 80 comprises a control unit 81, a computing unit 82, a memory unit 83, a display unit 84, an I/O unit 85 and a camera module 86. The camera module 86 further comprises a MEMS 87 and a photosensitive element 88.

In this embodiment the resolution of the image captured by the camera module 86 is (N×M). The control unit 81 is implemented by a controller or a processor to control the camera module 86, such as the focus, shutter or aperture ratio thereof. In another embodiment, the control unit 81 processes all the operation of the electronic device 80. In this embodiment, the control unit 81 controls the camera module 86 to capture a first image at a first time point. Then, the control unit 81 transmits a control signal to the MEMS 87 to shift the photosensitive element 88 of the camera module 86 for a predetermined distance or angle, and the camera module 86 captures the second image at a second time point.

The memory unit 83 stores the first image and the second image captured by the camera module 86. Furthermore, the memory unit 83 stores programs executed by the control unit 81. The I/O unit 85 is provided to the user for inputting data a, controlling the electronic device 80 or outputting the data of the electronic device 80. In one embodiment, the I/O unit 85 generates a control interface displayed in the display unit 84. In this embodiment, the display unit 84 shows images captured by the camera module 86 or the image generated by the computing unit 82.

The computing unit 82 receives the first image and the second image captured by the camera module 86, and applies an image comparison procedure to the first image and the second image to find corresponding relation between the first image and the second image to generate image information such as shown in FIG. 2 and FIG. 3. Then, the computing unit 82 combines the first image and the second image to generate a third image, wherein the resolution of the third image is (2N*2M). The detail operation of the computing unit 82 can be referred to the description of FIG. 4 and FIG. 5.

Figure 8B:
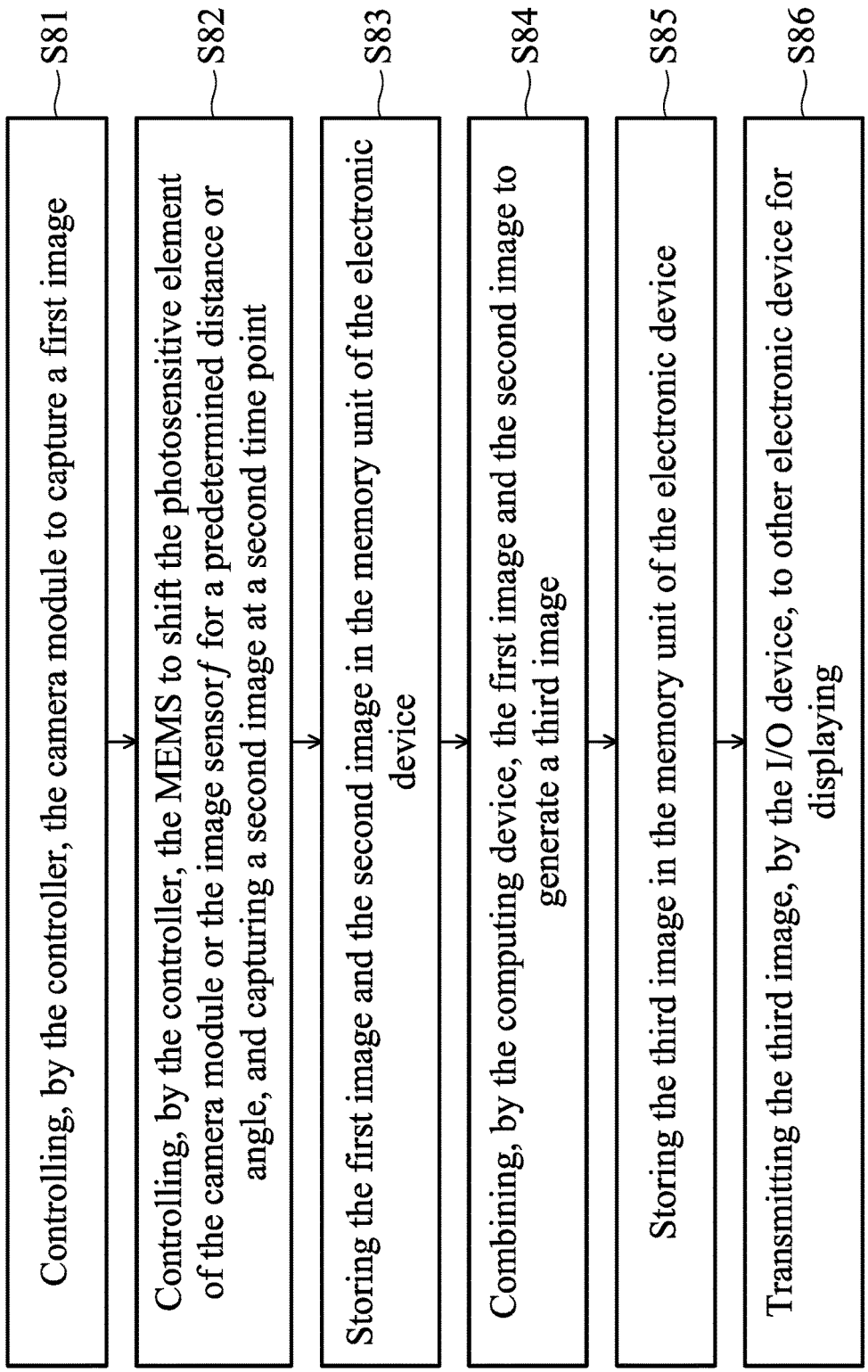
FIG. 8B is a flow chart of an image processing method according to another embodiment of the invention.

FIG. 8B is a flow chart of an image processing method according to another embodiment of the invention. The proposed image processing method can be applied to the electronic device with a single-lens camera module. In one embodiment, the image processing method can be executed by the electronic device of FIG. 8A. In step S81, the controller of the electronic device controls the camera module to capture a first image at a first time point. In step S82, the controller of the electronic device controls the MEMS to shift the photosensitive element of the camera module or the image sensor for a predetermined distance or angle, and the camera module captures the second image at a second time point.

In step S83, the first image and the second image are stored in the memory of the electronic device. In step S84, the computing device accesses the first image and the second image, and applies an image to the first image and the second image to find corresponding relation between the first image and the second image, such as the image information shown in FIG. 2 and FIG. 3. The computing unit combines the first image and the second image to generate the third image. In this embodiment, the resolution of the first image and the second image is (N×M), and the resolution of the third image is (2N×2M). The detail operation of the computing unit can be referred to the paragraphs corresponding to FIG. 4 and FIG. 5.

In step S85, the third image is stored in the memory of the electronic device and displayed by the display device of the electronic device. Note that when the user determines to generate a high-resolution image by the computing unit of the electronic device, the first image and the second image are not displayed on the display device of the electronic device. In step S86, the third image is displayed by the display device of the electronic device or transmitted to other device for displaying.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a camera module;
   a control unit to control the camera module to capture a first image and a second image; and
   a computing unit to receive the first image and the second image to generate a third image, wherein a resolution of the third image is higher than a resolution of the first image and the second image,
   wherein the computing unit generates a temporary image according to the first image and the second image, the temporary image comprises known pixels of the first image and the second image and a plurality of unknown pixels, and the computing unit calculates pixel values of the unknown pixels according to the known pixels of the first image and the second image to generate the third image.

2. The electronic device as claimed in claim 1, further comprising a storage device to store the first image, the second image and the third image.

3. The electronic device as claimed in claim 1, wherein the computing unit applies an image comparison procedure to the first image and the second image to find corresponding relation between the first image and the second image, and combines the first image and the second image to generate the third image according to the corresponding relation.

4. The electronic device as claimed in claim 3, wherein the camera module comprises a first lens to capture the first image and a second lens to capture the second image.

5. The electronic device as claimed in claim 1, wherein the camera module further comprises:
   a lens; and
   a MEMS (microelectromechanical systems) to control the lens, wherein the camera module captures the first image via the lens at a first time point, then the MEMS controls the lens to shift for a predetermined distance or a predetermined angle, and the camera module captures the second image via the lens at a second time point.

6. The electronic device as claimed in claim 1, wherein the camera module further comprises:
   a photosensitive element;
   a lens; and
   a MEMS (microelectromechanical systems) to control the photosensitive element, wherein the camera module captures the first image via the lens at a first time point, the MEMS controls the photosensitive element to shift for a predetermined distance or angle, and the camera module captures the second image via the lens at a second time point.

7. The electronic device as claimed in claim 1, wherein the computing unit arranges pixels on each row of the first image and pixels on each row of the second image in an interleaved manner to form the known pixels in the temporary image, and the known pixels and the unknown pixels are arranged in an interleaved manner so that the known pixels are not neighboring each other and the unknown pixels are not neighboring to each other, wherein the pixel value of each of the unknown pixels is an average of the neighboring known pixels closest to each unknown pixel.

8. An image processing method for an electronic device with a camera module, comprising:
   capturing a first image and a second image via the camera module;
   applying an image to the first image and the second image to find corresponding relation between the first image and the second image;
   combining the first image and the second image to generate a third image according to the corresponding relation, wherein a resolution of the third image is higher than a resolution of the first image and the second image,
   wherein the step of combining the first image and the second to generate the third image according to the corresponding relation comprises:
      generating a temporary image according to the first image and the second image, wherein the temporary image comprises known pixels of the first image and the second image and a plurality of unknown pixels; and
      calculating pixel values of the unknown pixels according to the known pixels of the first image and the second image to generate the third image.

9. The method as claimed in claim 8, wherein the camera module comprises a first lens to capture the first image and a second lens to capture the second image.

10. The method as claimed in claim 8, wherein the camera module further comprises a lens and a MEMS (microelectromechanical systems), wherein the camera module captures the first image via the lens at a first time point, then the MEMS controls the lens to shift for a predetermined distance or a predetermined angle, and the camera module captures the second image via the lens at a second time point.

11. The method as claimed in claim 8, wherein the camera module further comprises a photosensitive element, a lens and a MEMS (microelectromechanical systems), wherein the camera module captures the first image via the lens at a first time point, the MEMS controls the photosensitive element to shift for a predetermined distance or angle, and the camera module captures the second image via the lens at a second time point.

12. The method as claimed in claim 8, wherein the step of generating a temporary image according to the first image and the second image comprises:
   arranging pixels on each row of the first image and pixels on each row of the second image in an interleaved manner to form the known pixels in the temporary image, where the known pixels and the unknown pixels are arranged in an interleaved manner so that the known pixels are not neighboring each other and the unknown pixels are not neighboring to each other,
   wherein the step of calculating the pixel values of the unknown pixels comprises:
   calculating an average of the neighboring known pixels closest to each of the unknown pixels to obtain the pixel value of each of the unknown pixels.

* * * * *